US012069411B2

(12) United States Patent
Abramov

(10) Patent No.: US 12,069,411 B2
(45) Date of Patent: Aug. 20, 2024

(54) METHOD OF BUILDING A VIDEO SURVEILLANCE SYSTEM FOR SEARCHING FOR AND TRACKING OBJECTS

(71) Applicant: Aleksandr Vladimirovich Abramov, Moscow (RU)

(72) Inventor: Aleksandr Vladimirovich Abramov, Moscow (RU)

(73) Assignee: RETAIL TECHNOLOGIES, LLP (KZ)

( * ) Notice: Subject to any disclaimer, the term of this patent is extended or adjusted under 35 U.S.C. 154(b) by 0 days.

(21) Appl. No.: 17/271,731

(22) PCT Filed: Jul. 29, 2019

(86) PCT No.: PCT/RU2019/000526
§ 371 (c)(1),
(2) Date: Feb. 26, 2021

(87) PCT Pub. No.: WO2020/046171
PCT Pub. Date: Mar. 5, 2020

(65) Prior Publication Data
US 2021/0321063 A1    Oct. 14, 2021

(30) Foreign Application Priority Data
Aug. 29, 2018    (RU) .......................... RU2018131043

(51) Int. Cl.
*H04N 7/18*    (2006.01)
*G06T 7/20*    (2017.01)
(Continued)

(52) U.S. Cl.
CPC ............... *H04N 7/181* (2013.01); *G06T 7/20* (2013.01); *G06T 7/80* (2017.01); *G06V 20/52* (2022.01); *G06T 2207/10016* (2013.01)

(58) Field of Classification Search
CPC ...... H04N 5/23254; H04N 7/181; G06T 7/80; G06T 7/20; G06T 2207/10016;
(Continued)

(56) References Cited

U.S. PATENT DOCUMENTS 6,263,088 B1 * 7/2001 Crabtree .......... G08B 13/19602
382/104
9,928,594 B2 * 3/2018 Hamer ..................... G06T 17/05
(Continued)

FOREIGN PATENT DOCUMENTS

RU    2531876 C2    10/2014
RU    2634225 C1    10/2017
(Continued)

OTHER PUBLICATIONS

Russian-language International Search Report and Written Opinion issued in counterpart PCT Application No. PCT/RU2019/000526 dated Dec. 19, 2019 with English translation (seven (7) pages).

*Primary Examiner* — Christopher S Kelley
*Assistant Examiner* — Asmamaw G Tarko
(74) *Attorney, Agent, or Firm* — Todd Serbin; Maynard Nexsen PC

(57) ABSTRACT

A method of building a video surveillance system for object detection and tracking relates to the field of computer vision, and to methods and means of detecting and tracking moving objects, for example, persons. The method consists in special adjustment of each camera of a video surveillance system by means of calibration elements, linking cameras to the location plan, plotting a coordinate match of a coordinate system of a two-dimensional image of each camera with a three-dimensional system of coordinates of a location plan, for example premises; detecting and tracking objects of interest. The method makes it possible to construct motion tracks of objects of interest in the coordinate system of the location plan by means of multicamera surveillance, to
(Continued)

analyze the nature of behavior and motion of objects, assess their interaction and individual parameters, as well as to calculate the quantity thereof in location regions of interest.

5 Claims, 8 Drawing Sheets

(51) Int. Cl.
  *G06T 7/80* (2017.01)
  *G06V 20/52* (2022.01)
(58) Field of Classification Search
  CPC . G06T 2207/10024; G06T 2207/30196; G06T 2207/30232; G06T 2207/30242; G06T 7/292; G06T 7/73; G06V 20/52; G01S 3/7864; G08B 13/19608
  USPC .......................................................... 348/143
  See application file for complete search history.

(56) References Cited

U.S. PATENT DOCUMENTS

| | | | | |
|---|---|---|---|---|
| 9,998,656 | B2* | 6/2018 | Warzelhan | H04N 23/80 |
| 10,083,376 | B2* | 9/2018 | Kolavennu | G08B 13/19604 |
| 11,016,176 | B2* | 5/2021 | Papadelis | G01S 7/4972 |
| 11,143,736 | B2* | 10/2021 | Schindler | G01S 3/784 |
| 11,182,598 | B2* | 11/2021 | Sriram | G06V 40/20 |
| 2003/0095183 | A1* | 5/2003 | Roberts | G08B 13/19691 |
| | | | | 348/E7.086 |
| 2003/0107649 | A1* | 6/2003 | Flickner | G06T 7/292 |
| | | | | 348/169 |
| 2006/0269103 | A1* | 11/2006 | Brown | G06V 10/24 |
| | | | | 382/103 |
| 2008/0291278 | A1* | 11/2008 | Zhang | H04N 5/76 |
| | | | | 348/E7.085 |
| 2010/0082281 | A1* | 4/2010 | Nakamura | G06T 7/80 |
| | | | | 702/95 |
| 2014/0098243 | A1* | 4/2014 | Ghazizadeh | G01N 35/1095 |
| | | | | 348/187 |
| 2015/0116487 | A1* | 4/2015 | Ptitsyn | H04N 5/23254 |
| | | | | 348/143 |
| 2018/0158211 | A1* | 6/2018 | Ghazizadeh | G16H 30/40 |
| 2021/0321063 | A1* | 10/2021 | Abramov | G06T 7/20 |

FOREIGN PATENT DOCUMENTS

| | | | | |
|---|---|---|---|---|
| WO | 2012/005387 A1 | 1/2012 | | |
| WO | WO-2013172738 A1 * | 11/2013 | | G06F 17/30858 |

* cited by examiner

METHOD OF BUILDING A VIDEO SURVEILLANCE SYSTEM FOR SEARCHING FOR AND TRACKING OBJECTS

RELATED APPLICATIONS

This application is a U.S. national phase application, claiming priority under 35 U.S.C. § 371 to PCT application PCT/RU2019/000526, filed Jul. 29, 2019, claiming priority to Russian Patent Application No. 2018131049, filed on Aug. 29, 2018. The contents of these applications are incorporated herein by reference in their entireties.

FIELD OF INVENTION

The invention relates to the computer technologies, in particular, to the field of computer vision and to means and methods for detecting and tracking objects, including moving objects, for example, persons.

BACKGROUND OF INVENTION

CN 105940430 A discloses a method of calculating persons, the method consisting in processing a flow of images of a region of detection. The method provides for use of a virtual line in front of the camera, then a contour line of the heads of the people passing under the camera is detected, and the trajectories of their motion are tracked. The calculation of persons is performed due to crossing the trajectory of the head contour lines and the virtual line. This method has a number of shortcomings, namely, it is intended to calculate a number of people but does not allow building of a more developed analytics of tracks of their moving. Neither does this method provide building a multicamera video surveillance system.

CN 106228560 discloses a method for calculating persons on a complex scene with overlapped human figures. The method provides for use of a pretrained SVM classifier to determine locked targets for the appreciation of the number of persons on a scene. Although this method is similar to the method described above, it does not provide for building an analytics of tracks of motion of the objects in the location plan, or building a multicamera video surveillance system.

CN 106599776 discloses a method of calculation of persons basing on analysis of the tracks of their moving. The method provides for use of a stereo or an RGBD camera and a predetermined calibration of cameras of this type. Further, basing on use of a depth map, a separate image channel of the camera characterizing the image depth, that is a map of space distances from the camera to each of the visible points in the space, the tracks of moving of human figures are unloaded. The calculation of the number of persons is performed basing on analysis of the moving of human figures. A shortcoming of this approach is that the method needs complex cameras, such as stereo or RGBD cameras that should provide not only an image (black-and-white or colored) but also an image channel characterizing the distance from the camera to the objects of the viewed scene. The necessity of using such cameras is a significant impediment for the adoption of similar systems, among other things because of a high cost thereof. Neither does this method provide for building a multicamera video surveillance system in a location plan.

The closest prior art for the method of invention, functionally and by its use, is the "METHOD FOR COUNTING PERSONS USING A STEREOSCOPIC SYSTEM AND CORRESPONDING STEREOSCOPIC DEVICE FOR COUNTING PERSONS" disclosed in European Patent No. EP 2904543. This invention provides for use of stereo cameras fixed in the region of ceiling of the premises under surveillance, the cameras being directed downwards. In fact, the device is formed by combining two stereo cameras into a single transducer unit. The two cameras are spaced from each other at a distance that is called "stereoscopic base," the fusion of images received by the two cameras according to the stereoscopic principle makes it possible to obtain additional information—pseudo-depth of the image, that is, information of how far is located one or another portion of the processed image from the stereo cameras Further, basing on the data of the stereo cameras, systems of counting visitors are built, the systems being commonly available in the market for counting visitors and known as providing a high precision in actual practice. However, these method and system have a number of substantial defects, such as a high cost of the stereo cameras, because the stereo cameras requires using at least two expensive high resolution cameras and a system of processing a video stream; a small visibility scope of the stereo cameras—so, for example, if in case of a middle-sized premises the stereo cameras is looking perpendicularly to the floor from a height of three (3) meters, then its visibility scope would be rather limited—about 3 m×3 m (area about 9 $m^2$). Besides, this method is characterized by complexity of building a multicamera video surveillance system, because each stereo cameras is independent and it is difficult to consolidate the information from each stereo camera into a single system. Additionally, because of a limited visibility scope of the stereo cameras it would be necessary to install a great number of stereo cameras to provide a continuous coverage (surveillance) of the area of the premises, making a network at every six (6) meters, which would make the costs substantially high because of a high price of both the stereo cameras and the system as a whole.

SUMMARY OF INVENTION

The method of invention has the following advantages over the above-identified closest prior art. The claimed method provides for a possibility to use, for example, conventional video surveillance IP-cameras that are by an order less expensive than the stereo cameras used in the above closest prior art. In view of the fact that, when implementing the claimed method, a special attention shall be paid to building an exact coordinate match, each camera of the video surveillance system may be directed not vertically, looking into the floor, but it may be directed to look at an acute angle to the horizontal, by virtue whereof the area of visibility (scope) of the camera may be readily increased to values over 200 $m^2$ as a result of its more horizontal orientation. For example, on trials using a test rig, one of cameras oriented along a corridor covered a region of 16 m×9 m (area of 144 $m^2$), which is by an order more than can be obtained using stereo cameras of the closest prior art. Moreover, the claimed method allows building, with a high degree of accuracy, a multicamera video surveillance system by means of performing several steps of adjustment and calibration of each camera separately and subsequently linking all cameras to a single surveillance location plan. Besides, due to a substantially greater visibility scope of each camera, the claimed method allows installing cameras less densely than in the above closest prior art, which in turn makes a technical solution of similar problems substantially less expensive.

The present invention is directed to solving the technical problem of detecting, that is, detecting and tracking moving objects, for example, human bodies within a video stream, and to solving a business tasks of analyzing tracks, that is, sequences of locations of the objects under surveillance, particularly, persons, over time using a video surveillance system comprising at least one camera, for example, in shopping spaces, storing rooms, workplaces, handling premises etc., and in outdoor locations, for example, in the street, on the float, in the park, on a farm etc.

The following technical results are achieved by the method of invention: the possibility to plot tracks of moving objects, for example, persons, in the system of coordinates of a surveillance location plan; subsequent analysis of the behavior and moving of surveillance objects, for example, persons, including counting such objects located in predetermined areas, regions etc.; surveillance; the possibility to build heatmaps with respectively maximal and minimal concentrations of the objects under surveillance etc.; making it possible to analyze the nature of motion of the objects under surveillance and interactions of such objects, in particular, visitors and the staff personnel of the location under surveillance, making it possible to determine and assess individual parameters, such as, for example, height, size, sex, age, color palette of clothes etc. of the objects under surveillance; providing a multicamera video surveillance for each of the objects such that the same object under surveillance, for example, a person, is transferred from one video surveillance camera to another when exiting the visibility scope of one video surveillance camera and entering the visibility scope of another video surveillance camera, in case if such a video surveillance system comprises more than one camera, and a single track is plotted for the object in the space of a surveillance location plan; providing for building a system of detecting and tracking moving objects, for example, persons, in a video stream using at least one video surveillance camera; consolidation of all cameras (in case they are multiple) in a single surveillance system, particularly, allowing that overlapping zones of visibility scopes of neighboring cameras are minimal or absolutely lacking; the possibility to optimize the algorithm of implementation of the method of invention with respect to the computational resources used for this task; making it possible to plot a coordinate match between a two-dimensional pixel system of coordinates of a video image of each camera of the video surveillance system and a three-dimensional metric system of coordinates of a surveillance location plan (the principle of coordinate match).

The essence of the present invention consists in the following. Firstly, a preparatory adjustment of each of the cameras of the video surveillance system comprising at least one camera is performed. In case if one camera provides several different video streams, then the adjustment is performed for each video stream just like for a separate camera. The adjustment of each camera of the system is performed in several steps. Firstly, by means of calibration elements and/or groups of calibration elements, marking of the images from each camera of the video surveillance system for the location under surveillance, for example, a premises is carried out. Subsequently, basing on the calibration elements and/or groups of calibration elements, a subset of optical parameters and position parameters for each camera of the video surveillance system are calculated. Further, a polygon of the visibility scope of each camera of the video surveillance system is determined on each image, following which the polygons of the visibility scopes of the cameras of the video surveillance system are projected into the system of coordinates of a surveillance location plan. Next, all cameras of the video surveillance system are linked to the surveillance location plan and the rest of the optical parameters and position parameters for each camera of the video surveillance system are calculated, following which a coordinate match between a two-dimensional pixel system of coordinates of a video image of each camera and a three-dimensional metric system of coordinates of a surveillance location plan is plotted. Upon the completion of the above-described adjustment of the cameras of the video surveillance system, the video stream from each camera of the video surveillance system is captured with the adjusted parameters of the coordinate match, following which a frame-by-frame processing of the obtained video stream is performed, during which detecting and tracking objects of interest are carried out. Further, tracks of moving for each detected object are plotted on each camera of the video surveillance system, following which tracks of each detected object from each camera of the video surveillance system are connected in such a way that a multicamera video surveillance is provided to the effect that the same object is transferred from one video surveillance camera to another when exiting the visibility scope of one video surveillance camera and entering the visibility scope of another video surveillance camera, in case if such a video surveillance system comprises more than one camera, and a single track is plotted for the object in the space of a surveillance location plan. As a result, connected tracks of moving of the objects are plotted in a surveillance location plan, and then a further analysis of the nature of motion and behavior and individual parameters of such objects in all video surveillance system is performed.

DETAILED DESCRIPTION OF THE INVENTION

The above-mentioned technical results are achieved due to the following.

The video surveillance system comprises a set of an arbitrary number of video surveillance cameras or at least one video surveillance camera. The method of invention consists in that, firstly, each camera of the video surveillance system is adjusted, the adjustment making it possible to plot a coordinate match between a two-dimensional pixel system of coordinates of a video image of each camera and a three-dimensional metric system of coordinates of a surveillance location plan, for example, a surveillance premises plan. The adjustment of the cameras of the video surveillance system is performed in two steps and consists in a separately adjusting each camera and subsequently linking the cameras to the surveillance location plan, that is, consolidation of all cameras into a single system of coordinates of the location plan. It is a known fact that the position of a camera in a three-dimensional space can be described by such parameters as its horizontal turning angle, its vertical turning angle, its turning angle around its optical axis, the "x" and "y" points of the position of the camera in the system of coordinates of the location plan, the height ("h") of fixture of the camera (in meters), and by such optical parameters as the focal distance of the camera and its zoom. Such a process of adjustment of a video surveillance camera gives the operator a possibility manually, by means of any simple software mathematical tool, for example, any vector-mode drawing program, such as Adobe Illustrator, Inkscape etc., by means of marking special geometric objects (calibration elements) on the image of each camera, said geometric objects being necessary to determine all above-identified parameters of the camera, required to plot a three-dimensional model of the video surveillance system, in the surveillance location plan and to plot an exact coordinate match, that is, a matrix transformation from a two-dimensional pixel system of coordinates of a video image of each camera to a three-dimensional metric system of coordinates of a single surveillance location (for example, premises) plan and vice versa. In implementing the method of invention, plotting the above-mentioned coordinate match plays a key role in solving the technical problem of detecting and tracking objects, for example, persons, in a video stream in several elements of a video surveillance system at the same time.

Figure 1:
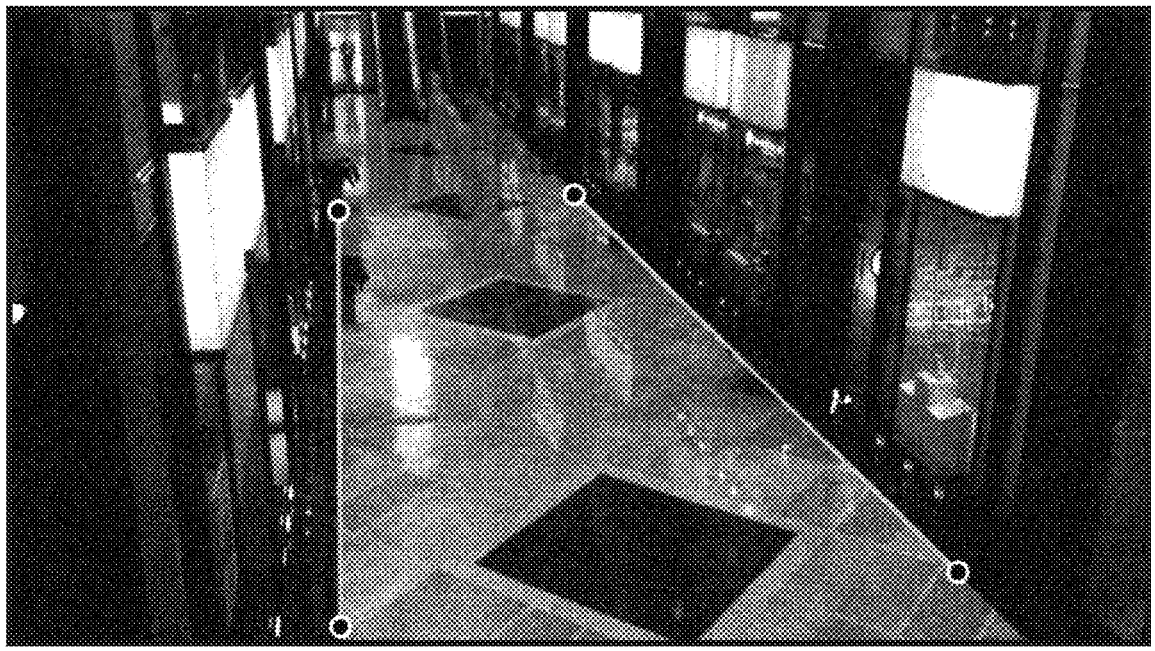
FIG. 1 is a perspective view image illustrating an example of an operator's manual marking of an image of a premises under surveillance by calibration elements of group 1 (spatially parallel lines on the floor).
Figure 2:
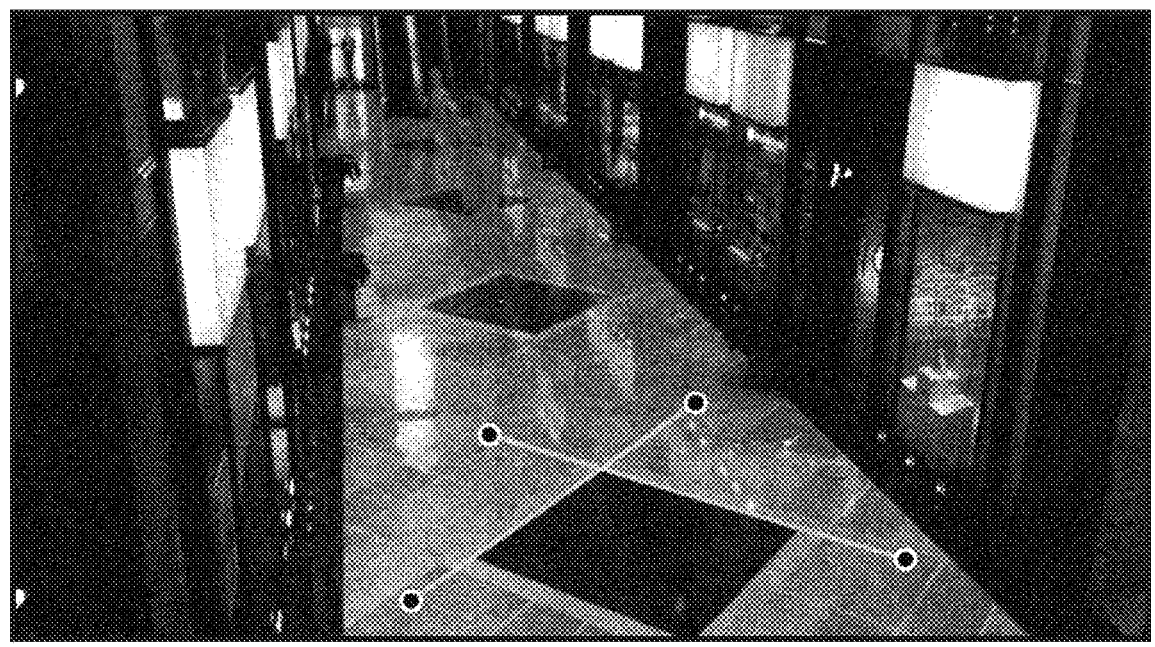
FIG. 2 is a perspective view image illustrating an example of an operator's manual marking of an image of a premises under surveillance by calibration elements of group 2 (spatially perpendicular lines on a floor tile).
Figure 3:
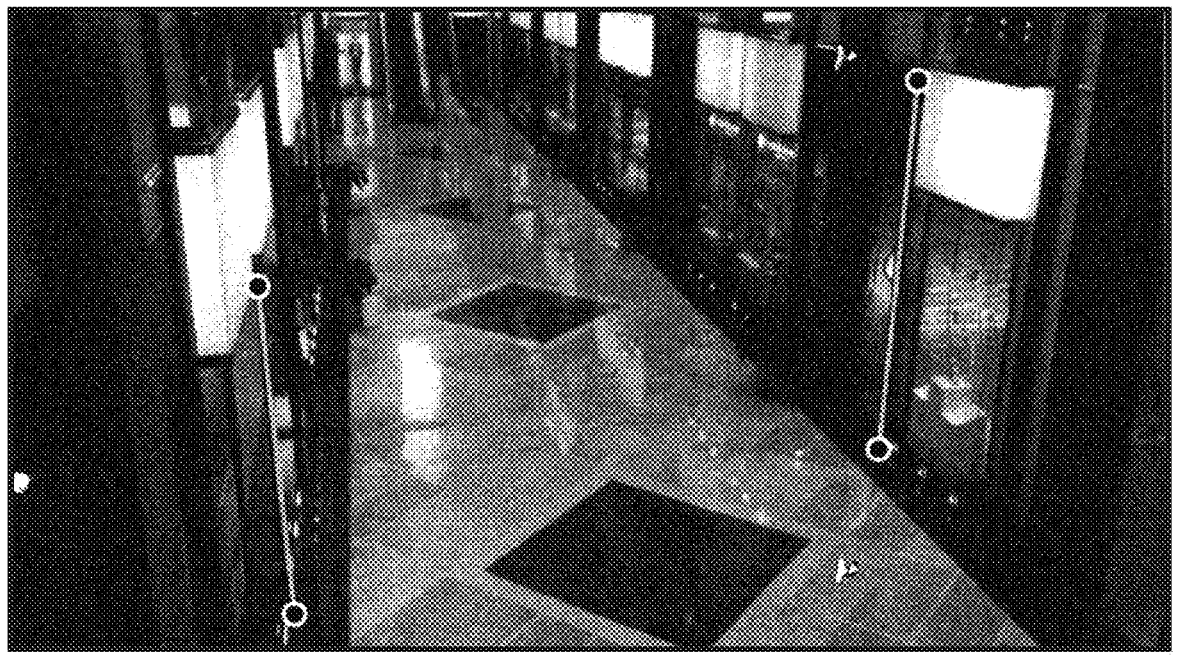
FIG. 3 is a perspective view image illustrating an example of an operator's manual marking of an image of a premises under surveillance by calibration elements of group 3 (spatially vertical pillars).
Figure 4:
FIG. 4 is a perspective view image illustrating an example of an operator's manual marking of an image of a premises under surveillance by markers of calibration elements (meter long rods of a certain color pattern marked by colors of the same sequence and disposed in front of the camera) to determine their coordinates on the camera image automatically.

Each camera of the video surveillance system is adjusted in the following manner. Firstly, a location, for example, a premises, is detected or marked by calibration elements or groups of calibration elements on the image of each camera of the video surveillance system. Geometric objects on the image of a camera are meant by the calibration elements, said geometric objects having predetermined spatial geometric positions such as, for example: segments of lines that are parallel to one another and to the horizontal plane of the floor in the space of the premises (calibration elements of group 1) (see FIG. 1); segments of lines that are perpendicular to one another and parallel to the plane of the floor in the space of the premises (calibration elements of group 2) (see FIG. 2); segments of lines that are parallel to one another and perpendicular to the plane of the floor in the space of the premises (calibration elements of group 3) (see FIG. 3); segments of lines that lie in the plane of the floor and are of the same size in the space of the premises (calibration elements of group 4) (see FIG. 4); and segments of lines that lie in the plane of the floor and are of the same size known in advance (calibration elements of group 5). In order to mark the calibration elements on an image from a camera automatically, use of markers of calibration elements is suggested, and automatically detecting them on the image; the markers of calibration elements are pre-readied physical objects, for example, one-meter long rods of a certain color pattern, for example, marked by colors of the same sequence, or circles etc. (see FIG. 4), that are placed within a location under surveillance in front of an installed camera of the video surveillance system for subsequently fixing an image, the physical objects being laid out and such markers that determine a needed set of calibration elements being detected automatically. The markers of the calibration elements are physically positioned, for example, in the horizontal plane of the floor of the location, for example, a premises, under surveillance (see FIG. 4), and subsequently the camera detects the color pattern of the elements-markers and detects the coordinates thereof on the camera image automatically. In case if it is physically difficult to place markers of calibration elements, for example, when there is no physical access to the visibility scope of the camera, or when only a video file is available received from the camera, marking a location, for example, a premises, under surveillance by calibration elements of groups 1 to 4 is performed on the image of such a premises by the operator manually. In this case the operator performs the marking by means of calibration elements or groups 1 to 4 of calibration elements on the image of the video camera basing on the operator's expert rating of specific features of the layout of such calibration elements within the space of the premises under surveillance. For example, calibration elements of group 1 can be defined as lines of angles of crossing of the floor with parallel lines of the walls, a tile pattern on the floor may be delineated etc. (see FIG. 1). Calibration elements of group 2 may be detected on the floor pattern as well, basing on the concept of the layout of the pillars in the premises, wall angles can be delineated etc. (see FIG. 2). Calibration elements of group 3 can be obtained by delineating, for example, vertical borders of the pillars, angles of the walls, tile patterns on the walls, various upright elements, angles of the furniture etc. (see FIG. 3). Calibration elements of group 4 can be obtained, for example, from a floor pattern, tiles, or by delineation of a distance between pillars, the width of the corridor etc. Calibration elements of group 5 differ from calibration elements of group 4 in that a real size of such elements is known at the moment of adjusting the camera and marking the premises.

Upon the completion of marking the image of the location under surveillance, calculation of a subset of optical parameters and position parameters of each camera of the video surveillance system is performed basing on the calibration elements of groups 1 to 5 received in marking as defined on the image of each camera by the operator or automatically. The coordinate match between a two-dimensional pixel system of coordinates of a video image of each camera and a three-dimensional metric system of coordinates of a single plan of the location under surveillance depends on the parameters looked for of each camera of the video surveillance system. Said calculation suggests a search of values of those parameters of the camera in such a way that a priori concepts of the spatial positions of calibration elements within the location, for example, a premises under surveillance, correspond to their positions received as a result of use of the coordinate match dependent on the above-described parameters. For example, for calibration elements of group 1, the received coordinate match shall map respective segments of the lines of the calibration elements to a three-dimensional metric system of coordinates of a surveillance location plan in such a way that said segments are parallel to one another in the space of the location under surveillance, that is, in the system of coordinates of a location plan, for example, a location plan of a premises under surveillance. Calibration elements of group 2 shall be perpendicular to one another in a three-dimensional metric system of coordinates of a surveillance location plan. Calibration elements of group 3, upon being mapped to a three-dimensional metric system of coordinates of a surveillance location plan, shall be strictly vertical. Calibration elements of groups 4 and 5, upon having been mapped to a three-dimensional metric system of coordinates of a surveillance location plan, shall be of the same size. The size of calibration marker elements of group 5, upon having been mapped to a three-dimensional metric system of coordinates of a surveillance location plan, shall correspond to a value known in advance. Various combinations of groups of calibration elements enable to define a subset of optical parameters and position parameters of each camera of the video surveillance system. For example, a combination of calibration elements of groups 1, 2, and 3 can together define such parameters as the vertical turning angle of the camera, its turning angle around its optical axis, and the focal distance of the camera. Calibration elements of group 5 define such parameters as the vertical turning angle of the camera, its turning angle around its optical axis, the height of fixture of the camera (in meters), the focal distance of the camera and its zoom. Calibration elements of group 4 define such parameters as the vertical turning angle of the camera, its turning angle around its optical axis, and the focal distance of the camera.

The choice of groups of calibration elements used for marking the image of a location under surveillance depends on what spatial lines dominate in the image from the camera. If repeating patterns, for example, tiles are expressly seen in the image, then it can be convenient for the operator to mark calibration elements of group 4 in case the size of the elements of the tile pattern is unknown, or calibration elements of group 5 in case the size of the elements of the tile pattern is known. Consequently, calibration elements of groups 4 and 5 are all-sufficient, that is, it would be sufficient to mark only elements of one of these groups at the stage of marking the image of each camera. In case there is no repeating pattern, or if it is not seen expressly, it would be necessary that the operator would have to choose calibration elements of groups 1, 2, and 3 for the marking. Calibration elements of these groups are not all-sufficient, consequently, to mark such an image, the operator would have to use calibration elements of each of these groups, that is, segments of lines spatially parallel to one another, segments of lines spatially perpendicular to one another, and vertical segments of lines. Thus, in marking the image of each camera by means of calibration elements, the operator is governed by visible details of the location under surveillance in the image and chooses suitable calibration elements of group 4 or 5, or a combination of calibration elements of groups 1, 2, and 3 (see FIGS. 1 to 4).

Upon the completion of marking or detecting calibration elements, a partial plotting of a coordinate match between a two-dimensional system of coordinates of images of the cameras and a three-dimensional system of coordinates of a surveillance location plan is performed in such a way that this coordinate match would provide the fulfillment of a priori conditions of the spatial positions of calibration elements, when the calibration elements are projected from the system of coordinates of the camera image into the three-dimensional system of coordinates of a surveillance location plan. Plotting the coordinate match is necessary to make it possible subsequently projecting the polygons of visibility scopes into a system of coordinates of a surveillance location plan without perspective deformation that is, correctly, with an accuracy to rotation, shift, and scale.

Figure 5:
FIG. 5 is a perspective view image illustrating an example of marking of the visibility scopes of each camera of the video surveillance system.

Further, the polygons of visibility scopes of each camera are marked. The operator outlines the visibility scope (polygon), specifying an area of the floor within which detecting and tracking moving objects, for example, persons (see FIG. 5), in the image of each camera of the video surveillance system is suggested.

Figure 6:
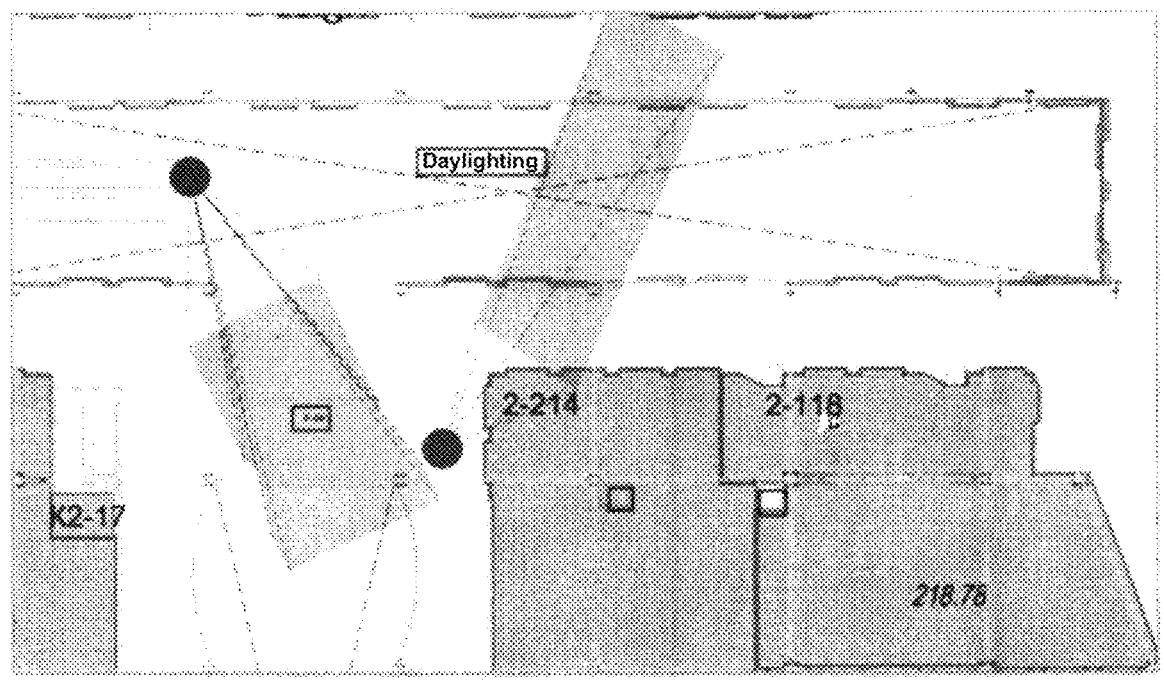
FIG. 6 is a top view drawing illustrating an example of projection of the visibility scopes of each camera of the video surveillance system into a three-dimensional metric system of coordinates of a plan of the premises under surveillance.
Figure 7:
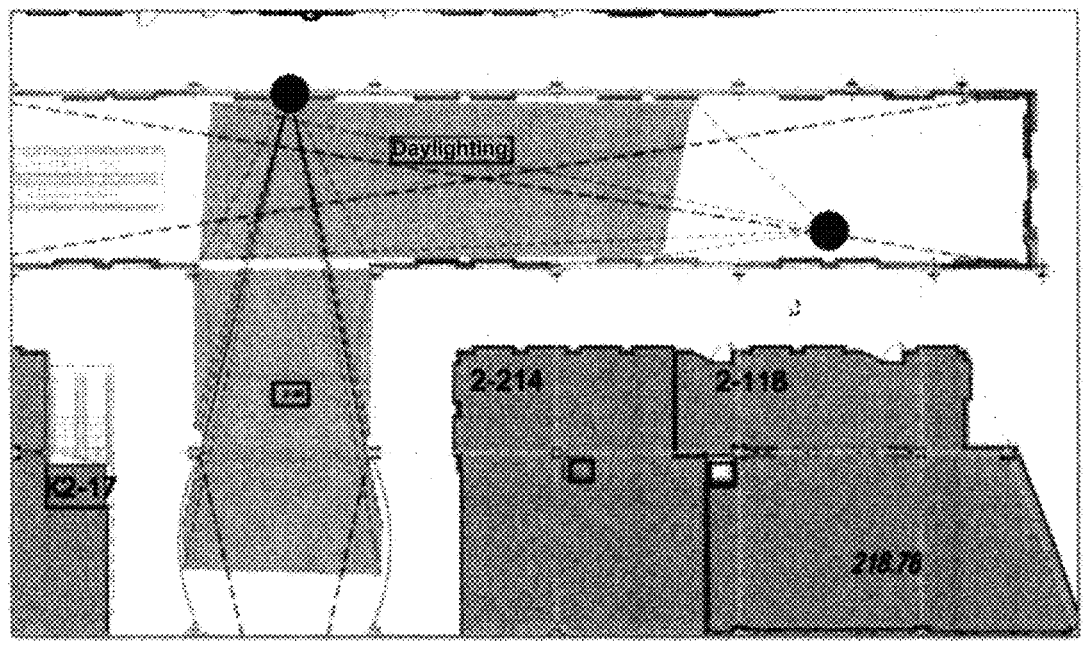
FIG. 7 is a top view drawing illustrating an example of linking all cameras of the video surveillance system to a single plan of the premises under surveillance and plotting a coordinate match of a two-dimensional pixel system of coordinates of a video image of each camera of the video surveillance system with a single three-dimensional metric system of coordinates of a plan of the premises under surveillance.
Figure 8:
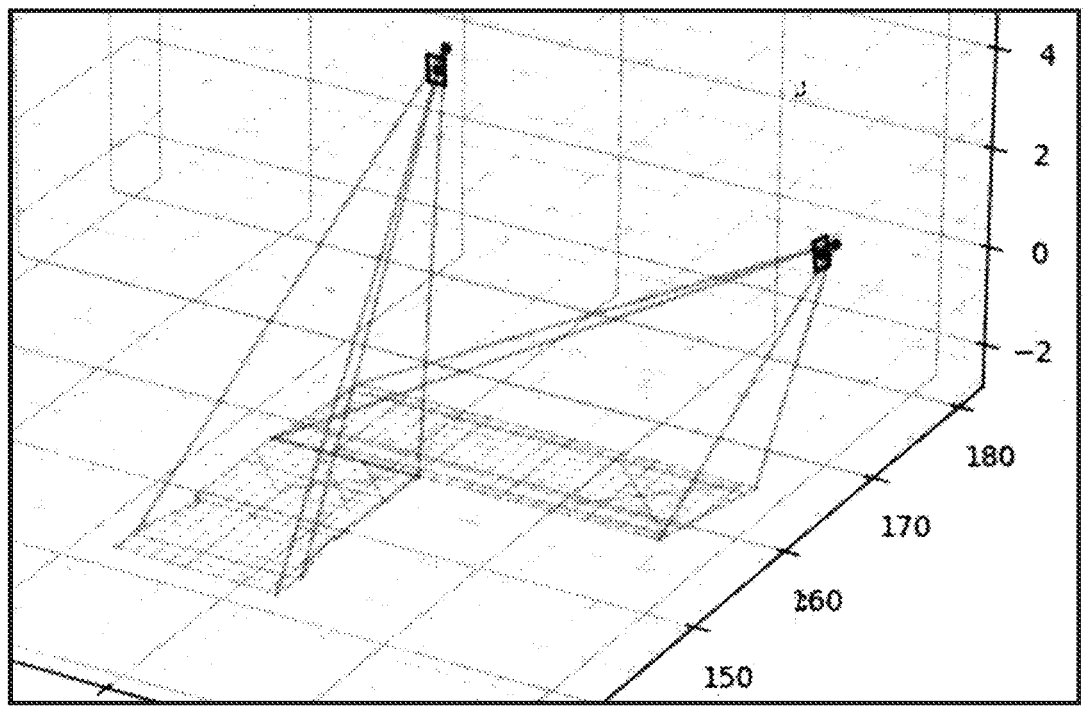
FIG. 8 is a perspective view drawing illustrating an example of a three-dimensional model of a video surveillance system comprising two cameras.
Figure 9:
FIG. 9 is a perspective view image illustrating an example of the projection of the visibility scope of one camera of the video surveillance system from a three-dimensional system of coordinates of the plan of the premises under surveillance onto the image.

Subsequently, projecting the visibility scopes of each camera of the video surveillance system into a three-dimensional metric system of coordinates of a surveillance location plan is performed. Due to that a subset of parameters of the camera were defined at the stage of adjustment of the camera by means of calibration elements of groups 1 to 5, it is possible to project a delineated polygon of a visibility scope of each camera to the plane of the floor into a three-dimensional metric system of coordinates of a location (for example, premises) plan (see FIG. 6). Projecting the polygons of visibility scopes of each camera of the video surveillance system onto the plane of the floor of the premises results in that the projections of said polygons of visibility scopes have a correct (without perspective deformation) spatial form with an accuracy to rotation, shift, and scale (see FIGS. 6 and 7).

This done, linking all cameras of the video surveillance system to a single surveillance location plan and plotting a full coordinate match between a two-dimensional pixel system of coordinates of the image of each camera and a single three-dimensional metric system of coordinates of a surveillance location (for example, premises) plan is performed in the following manner. As soon as all projections of the polygons of visibility scopes of the cameras of the video surveillance system onto the plane of the floor of the location under surveillance are obtained, it is necessary to obtain a correct linking of each polygon to a corresponding position on the surveillance location plan. This can be achieved by rotating, shifting, and scaling of the projected polygon of the visibility scope of each camera of the video surveillance system. When the polygons of the visibility scopes of the cameras of the video surveillance system are disposed correctly, all correct linkings of each camera to a single location plan are saved (see FIG. 7).

As soon as correct positions of each camera of the video surveillance system on a single surveillance location plan are saved, calculation of lacking optical parameters and position parameters of each camera of the video surveillance system is performed. The horizontal turning angle of the camera is calculated based on rotating the polygons of visibility scope of each camera of the video surveillance system. The "x" and "y" points of the position of the camera in the three-dimensional metric system of coordinates of the location plan are calculated based on shifting the polygons of visibility scope of each camera of the video surveillance system. The height ("h") of fixture of the camera (in meters) and the zoom of the camera are calculated based on scaling the polygons of visibility scope of each camera of the video surveillance system.

Due to that all optical parameters and position parameters of each camera of the video surveillance system have been calculated, it becomes possible to build a full three-dimensional model of a system comprising several cameras and to obtain a full coordinate match of a two-dimensional pixel system of coordinates of the image of each camera with a three-dimensional metric system of coordinates of a surveillance location plan in the form of a corresponding matrix transformation. Such a coordinate match helps provide surveillance, detecting and tracking objects using a video surveillance system comprising an arbitrary number of cameras, or at least one camera, so that the objects under surveillance, for example, moving human bodies, are projected, with a high degree of accuracy, from each camera into a single three-dimensional metric system of coordinates of a surveillance location plan, which in turn provides a possibility to keep track of the objects under surveillance and convey the objects from one camera to another without loss of the identity of the track, that is, the principle of a multicamera surveillance is observed. Thereat, to achieve the claimed technical results, it is sufficient that the polygons of visibility scopes of the cameras of the video surveillance system are overlapped at a minimum, or they do not overlap at all, the polygons being disposed contiguously with small gaps between polygons of visibility scopes of neighboring cameras of the video surveillance system.

Further, basing on the adjusted system of coordinate match for all cameras as a video surveillance system, the problem of detecting and tracking objects, for example, moving human bodies, is to be solved.

Detecting the objects, for example, persons, are performed by capturing a video stream from each of the video surveillance cameras or from a file with a formerly recorded video, on which the objects looked for, for example, persons, are detected by means of a frame-by-frame processing.

The tracking consists in tracing each of the objects found in the course of detecting the objects from frame to frame. Using the plotted coordinate match, tracking of the objects, particularly human bodies, enabling to assess parameters of position and parameters of the motion of the objects can be performed not in a two-dimensional system of coordinates of the video image of a camera, but in a single three-dimensional metric system of coordinates of a surveillance location, which allows achieving a substantial improvement of the quality of tracking. Due to that the space, within which the parameters of the position and motion of the objects are assessed for each camera, is consolidated into a single system of coordinates of a location plan, a multicamera video surveillance is provided. In such a surveillance, a corresponding coordinate match is plotted for each camera of the video surveillance system, which makes it possible to convey the same detected object, for example, a person, from one video surveillance camera to another and to plot its single track in a three-dimensional metric system of coordinates within the space of a location plan (see FIGS. 10 and 11). Thus, an object under surveillance exits the visibility scope polygon of one video surveillance camera and enters the visibility scope polygon of another camera, the video surveillance camera identifying it as the same object and plotting a single track of its motion, that is, consolidation of all cameras into a single system of coordinates is provided (see FIGS. 10 and 11). A single track of the motion of an object is plotted as a concatenation of separate tracks defined by each camera in a three-dimensional system of coordinates of a location plan. This approach makes it possible to plot a coordinate match of each camera with a single system of coordinates of a location plan, therefore, it becomes possible to concatenate the tracks of detected objects from each camera into a single track basing on the match of coordinates and the direction of motion of an object under surveillance, as the tracks are in the same system of coordinates. The procedure of co-locating tracks of detected objects from each camera of the video surveillance system consists in the following.

Figure 10:
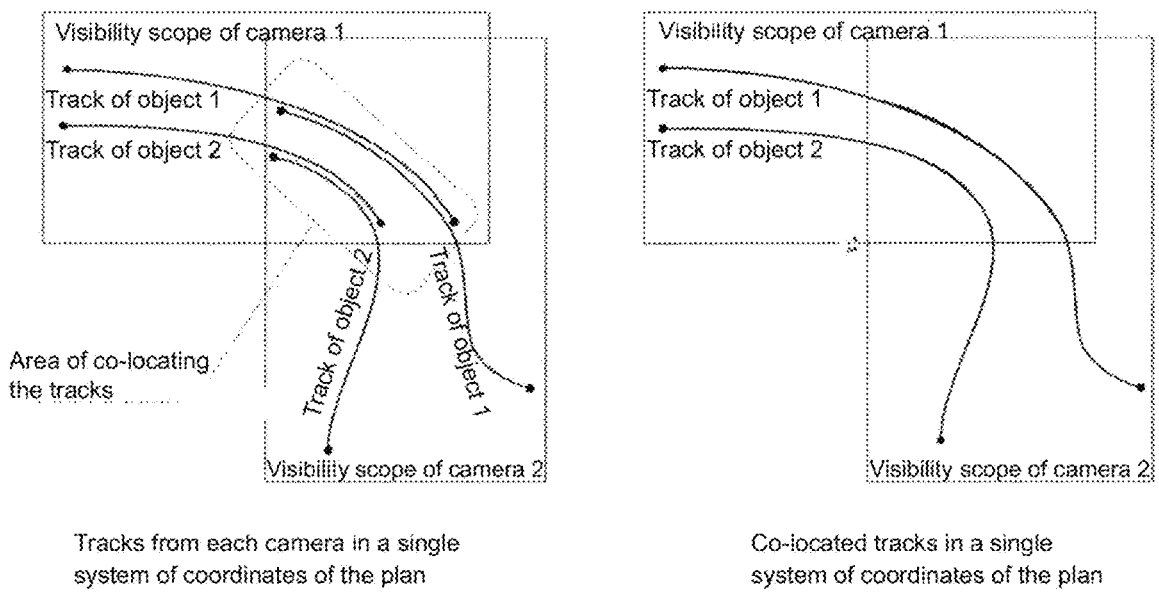
FIG. 10 is a drawing illustrating the principle of connection of the tracks from each camera of the video surveillance system, the tracks being projected into a single system of coordinates of the plan of the premises, into a single track of the object under surveillance for the case where the polygons of the visibility scopes of the cameras overlap.

As can be seen in FIG. 10, the polygon of the visibility scope of each camera encompasses tracks of corresponding objects received as a result of detecting and tracking the objects within the visibility scope of each camera projected into a single three-dimensional system of coordinates of a location plan. An area of co-locating tracks is defined in FIG. 10. The points of the tracks in the area of co-location match by times and the tracks themselves are of similar shapes and have similar directions of motion of the objects. As an additional information for the co-location of tracks, a set of color parameters of an object under surveillance, in particular, in case of a person, the color palette of their dress may be used. The co-location of tracks results in that separate tracks of the same object from each camera are linked together and a single co-located track is plotted for each object under surveillance.

Figure 11:
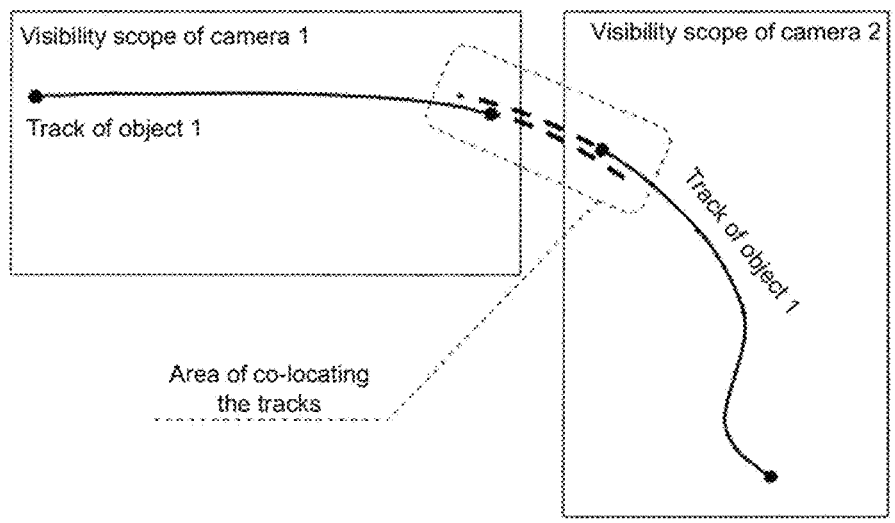
FIG. 11 is a drawing illustrating the principle of connection of the tracks from each camera of the video surveillance system, the tracks being projected into a single system of coordinates of the plan of the premises, into a single track of the object under surveillance for the case where the polygons of the visibility scopes of the cameras do not overlap, but are neighboring.
Figure 11:
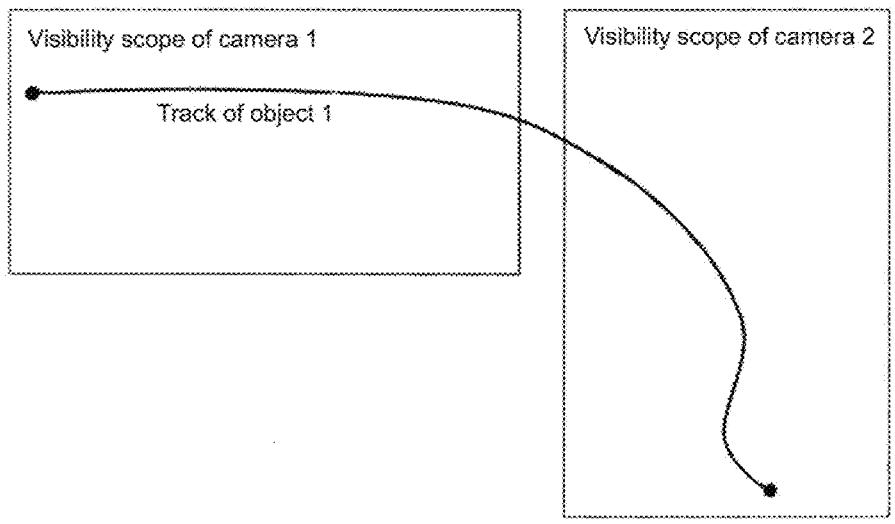
Figure 12:
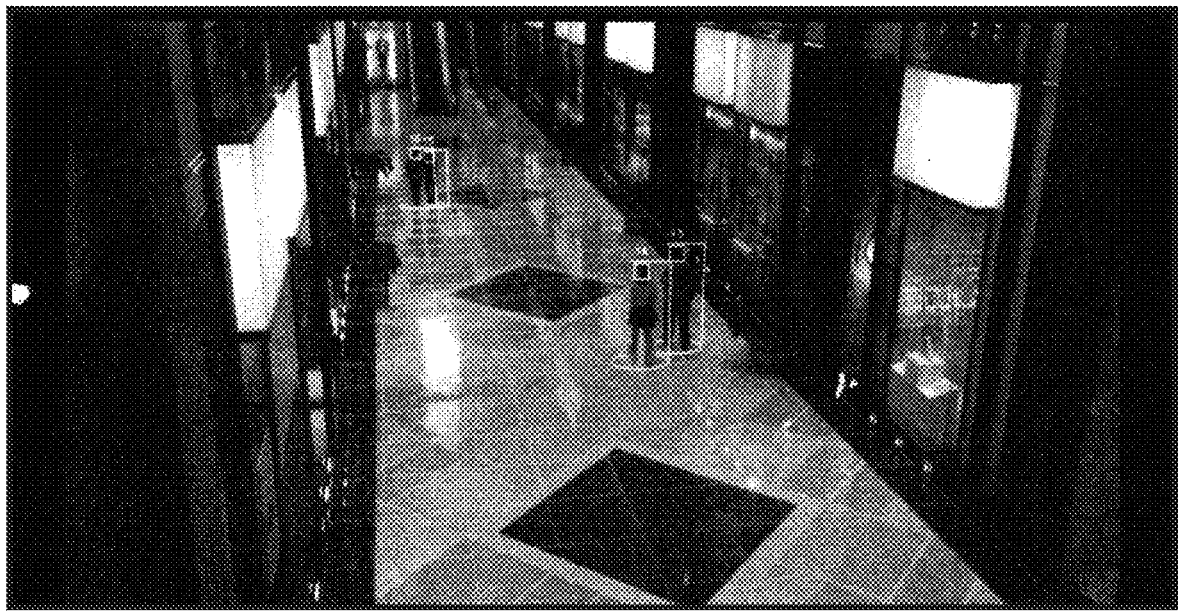
FIGS. 12 and 14 are perspective view images illustrating an example of detecting and tracking of moving objects (persons) in the space of a premises using the principle of coordinate match in linking to the plan of the premises.
Figure 13:
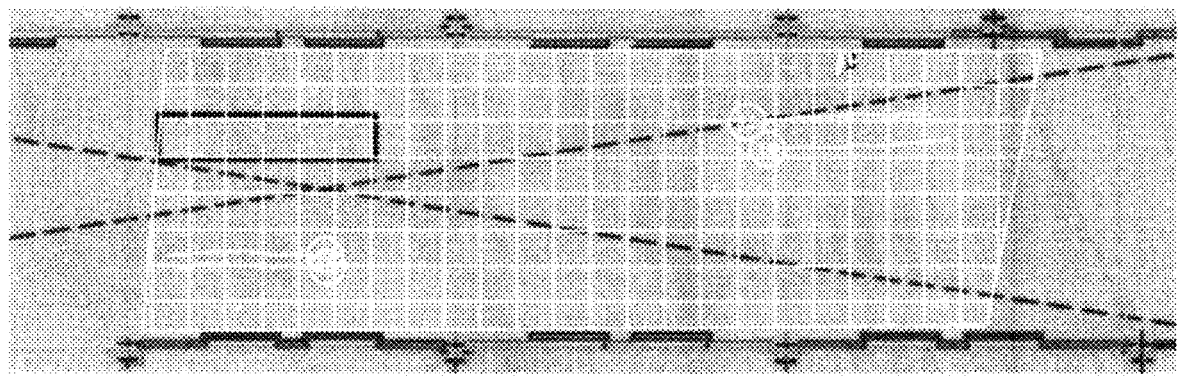
FIGS. 13 and 15 are drawings illustrating an example of detecting and tracking of moving objects (persons) in the space using the principle of coordinate match in linking to the plan of the premises.
Figure 14:
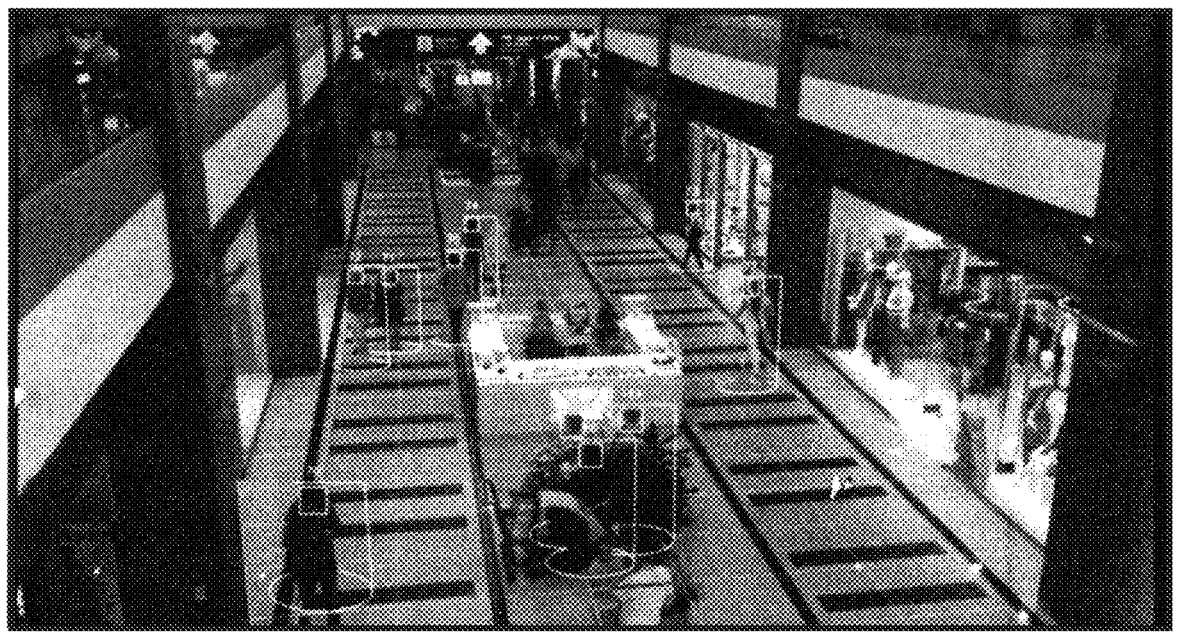
Figure 15:
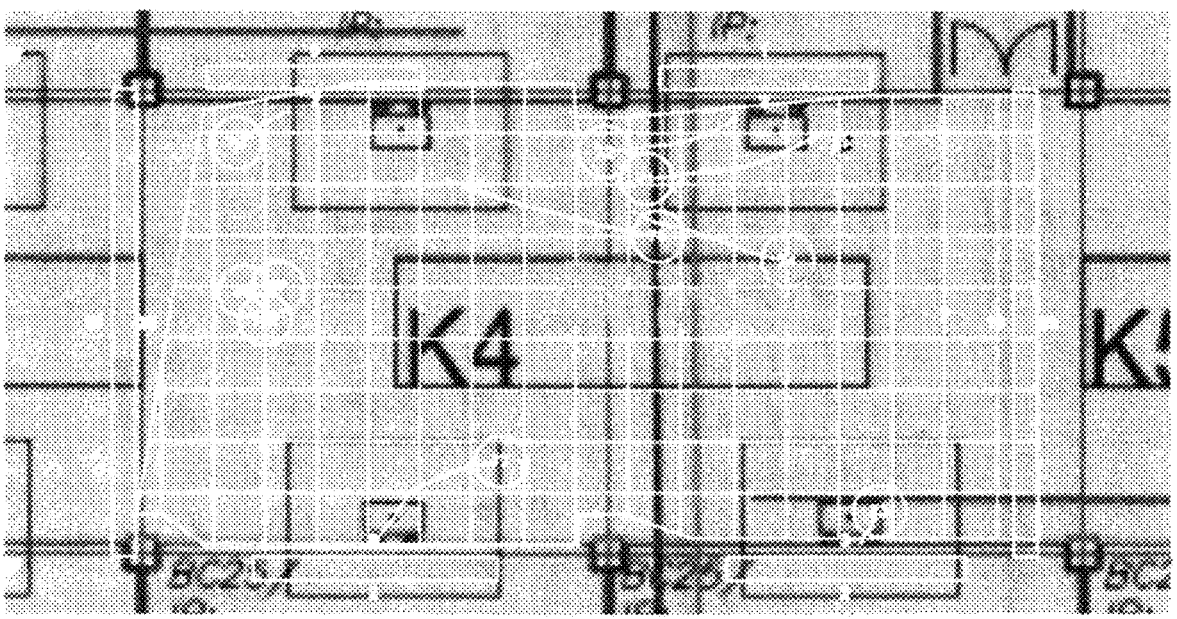

In case if the polygons of visibility scopes of the cameras do not overlap, the co-location of tracks is performed based on additional tracks obtained using a model of motion of the object under surveillance. FIG. 11 shows a graphic pattern of co-location of tracks of motion of an object in case of non-overlapping polygons of visibility scopes of two cameras. Firstly, predictive accretions of two tracks is plotted toward each other based on a concept of the trajectory and velocity of the motion of the object under surveillance, then, a co-location of the tracks is plotted similarly to the case of overlapping zones, as described above.

Detecting and tracking objects in a video stream is a classical computer vision problem and it traditionally needs a reasonable amount of computational resources to provide a frame-by-frame processing of the video stream. In detecting and tracking, the task complexity conditioned by the necessity to process a great amount of data and by plotting complex models of representation and motion of the objects under surveillance, which in turn imposes certain computational constraints.

The availability of an exact coordinate match between the system of coordinates of the camera image and a three-dimensional system of coordinates of a location plan for the task of detecting and tracking objects, for example, human bodies, makes it possible to use, as much as possible, a priori concepts of the outline dimensions of an objects looked for, for example, a human body, which makes it possible to improve the quality of detecting and tracking objects and to optimize the implementation procedure by means of the method of invention from the perspective of the computational resources used for this task.

Subsequently, a further analysis of the nature of behavior, motion, interactions, individual characteristics etc. of the objects under surveillance is performed, among other things for solving problems of detecting objects, for example, persons, of calculating the number of objects under surveillance, for example, present in predetermined zones, areas etc. of a surveillance location and of similar surveillance, providing a possibility to plot "hot" and "cold" zones with a most and least concentration of objects under surveillance etc. The assessment of such parameters as velocity and position of objects under surveillance in a three-dimensional metric system of coordinates of a location plan makes it possible to build a developed analytical system on the location plan and to analyze the motion of detected objects, for example, persons. Due to a high accuracy of the coordinate match and further exactly defining co-located tracks of the motion of objects under surveillance, a possibility emerges, particularly, to define interactions of objects under surveillance, for example, between store clerks and shoppers, and interactions between objects under surveillance and environment, for example, between shoppers and the shop board, show window etc.

The claimed method of building a video surveillance system for objects detection and tracking was practically used in implementing a test rig. Several video surveillance cameras were installed in a premises of a shopping and leisure center. In this example, video cameras were used, but the type of cameras is immaterial for the achievement of the declared technical results when implementing the method of invention. Neither does matter the nature of the location under surveillance, should it be an indoor, or outdoor area. Some visible scopes of the cameras were in juxtaposition. Firstly, each camera was adjusted, the operator having marked the image of the premises by calibration elements of groups 1, 2, and 3 in the course of the adjustment. Thereupon, corresponding polygons of the visibility scopes of each camera were delineated on the camera image. Marking the image of the premises by calibration elements made it possible to determine the following parameters of each camera: its vertical turning angle, its turning angle around its optical axis, and its focal distance. Certain parameters made it possible to project the polygon of visibility scope of each camera to the plane of the floor of the premises under surveillance. Then the operator obtained a correct position of the cameras on the plan of premises by means of rotation, shift, and scaling of the polygons of visibility scopes of the cameras. Thereupon, the operator plotted final coordinate matches between a two-dimensional pixel system of coordinates of a video image of each camera and a single three-dimensional metric system of coordinates of a surveillance premises plan. Then each camera performed detecting objects under surveillance, who were persons—visitors of a shopping center, and projected tracks of the motion of each person under surveillance into a single three-dimensional metric system of coordinates of the premises plan into its visibility scope. Thereupon, track segments from each camera were co-located, and a set of combined tracks in a single three-dimensional metric system of coordinates of the premises plan was obtained. During the operation of the deployed test rig, a video stream with a running time of 5 hours and 13 minutes was processed. Based on the obtained tracks of motion of the stream of visitors, an analytical system was built and shown on the surveillance premises plan, said system providing the following set of metrics with corresponding values:

the number of captured unique visitors—631 persons;
the number of visitors who entered the area of the test rig—389 persons;
the number of visitors who exited the area of the test rig—234 persons;
percentage of visitors moving in pairs—23%;
average duration of presence in the test rig area—16 minutes;
the ratio of the visitors who entered shops to the visitors who passed by—14.1%.

Thus, the test rig starkly illustrated its working capacity and the achievement of the tasks set and the declared technical results.

The invention claimed is:

1. A method of building a video surveillance system for object detection and tracking, the system comprising at least one camera, the method comprising the steps of:

firstly, a preparatory adjustment of each of the cameras of the video surveillance system is performed, said preparatory adjustment consisting in marking the images of the location under surveillance received from each camera of the video surveillance system by calibration elements and/or groups of calibration elements, visible in the location under surveillance, said calibration elements including segments of lines that are parallel to one another and to the horizontal plane of the floor in the space of the surveillance location, segments of lines that are perpendicular to one another and parallel to the plane of the floor in the space of the surveillance location, and segments of lines that are parallel to one another and perpendicular to the plane of the floor in the space of the surveillance location, calculation of the vertical turning angle (pitch angle) of each camera, the turning angle of each camera around its optical axis (roll angle), and the focal distance of each camera of the video surveillance system based on the calibration elements and/or groups of calibration elements, marking the polygons of visibility scopes of each camera of the video surveillance system, projecting the polygons of the visibility scopes of the cameras of the video surveillance system into a system of coordinates of the surveillance location plan, linking all cameras of the video surveillance system to the surveillance location plan, calculating the rest of the optical parameters and position parameters for each camera of the video surveillance system, calculating of the horizontal turning angle (yaw angle) of the camera is performed by rotating the polygons of visibility scope of each camera of the video surveillance system, calculation of the "x" and "y" points of the position of each camera in said three-dimensional system of coordinates of the surveillance location plan is performed by shifting the polygons of visibility scope of each camera of the video surveillance system, calculation of the height of fixture of the camera and zoom of the camera is performed by scaling the polygons of visibility scope of each camera of the video surveillance system, and plotting a coordinate match between a two-dimensional pixel system of coordinates of the video image of each camera and a three-dimensional metric system of coordinates of the surveillance location plan;

subsequently capturing the video stream from each camera of the video surveillance system with adjusted parameters of the coordinate match; subsequently frame-by-frame processing of the obtained video stream during which detecting and tracking objects of interest are carried out; subsequently plotting tracks of motion for each detected object on each camera of the video surveillance system, following which detected tracks from each camera of the video surveillance system are connected in such a way that a multicamera video surveillance is provided to the effect that the same object is transferred from one video surveillance camera to another and a single track is plotted for it in the surveillance location plan in case if such a video surveillance system comprises more than one camera; a subsequent further analysis of the nature of motion and behavior and individual parameters of such objects in all video surveillance system based on the connected tracks of the objects in the system of coordinates of the surveillance location plan.

2. The method according to claim 1, characterized in that the method is intended for the surveillance over moving objects, for example, persons.

3. The method according to claim 1, characterized in that, for example, one-meter long rods marked by colors of the same sequence may be used as said calibration elements.

4. The method according to claim 1, characterized in that the polygons of visibility scopes of the cameras of the video surveillance system may be overlapped at a minimum or not overlap at all, the polygons being disposed contiguously with small gaps between polygons of visibility scopes of neighboring cameras of the video surveillance system.

5. The method according to claim 1, characterized in that said segments of lines that are parallel to the floor are, in particular, segments of lines that lie in the plane of the floor and are of the same size in the space of the surveillance location, for example, premises; and, physical objects-markers that lie in the plane of the floor in front of the camera in the space of the surveillance location, for example, premises, and have the same and known in advance shape, size, and color pattern for subsequently automatically detecting the position thereof and automatically determining their coordinates in the camera image.

* * * * *